UNITED STATES PATENT OFFICE 2,498,248

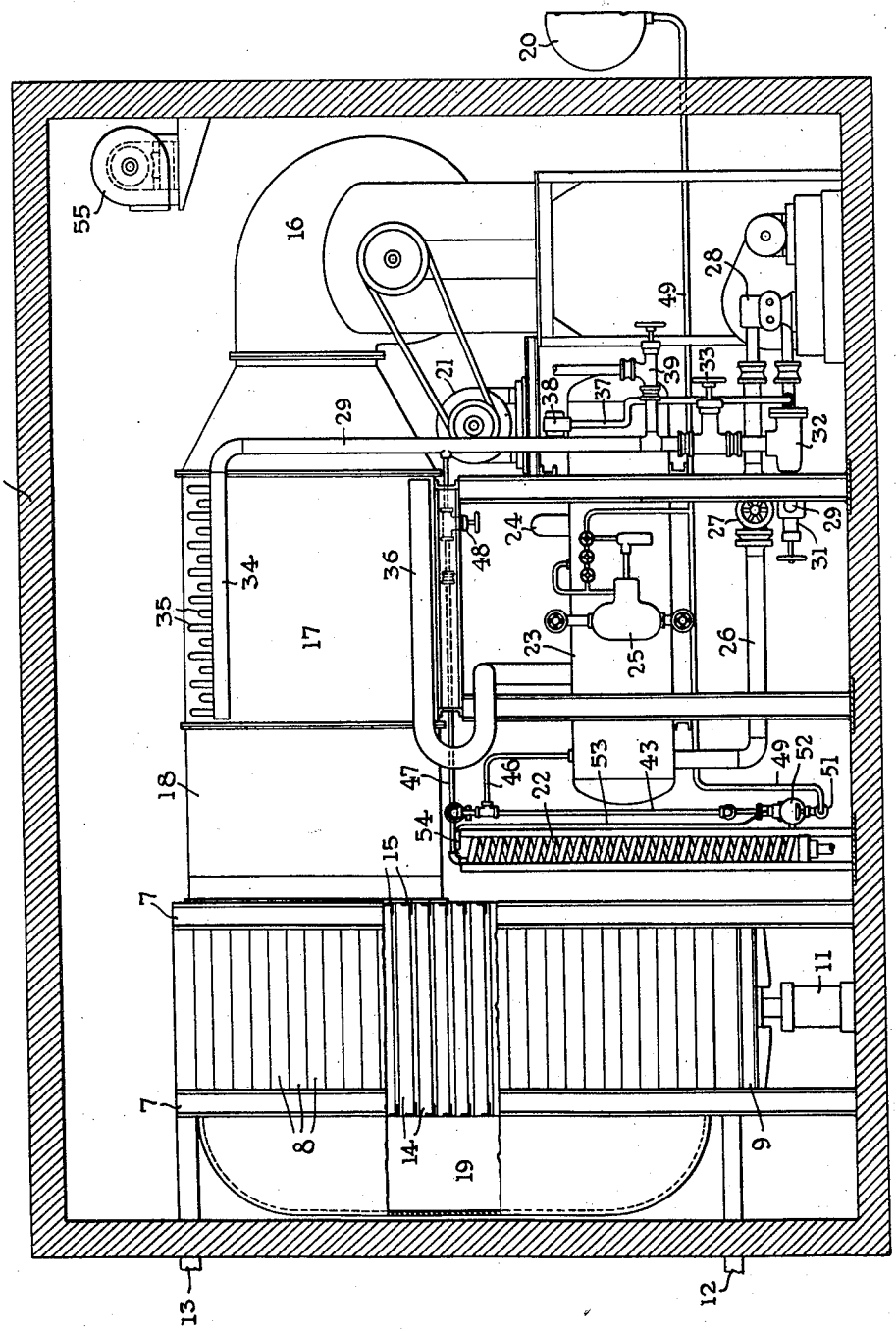

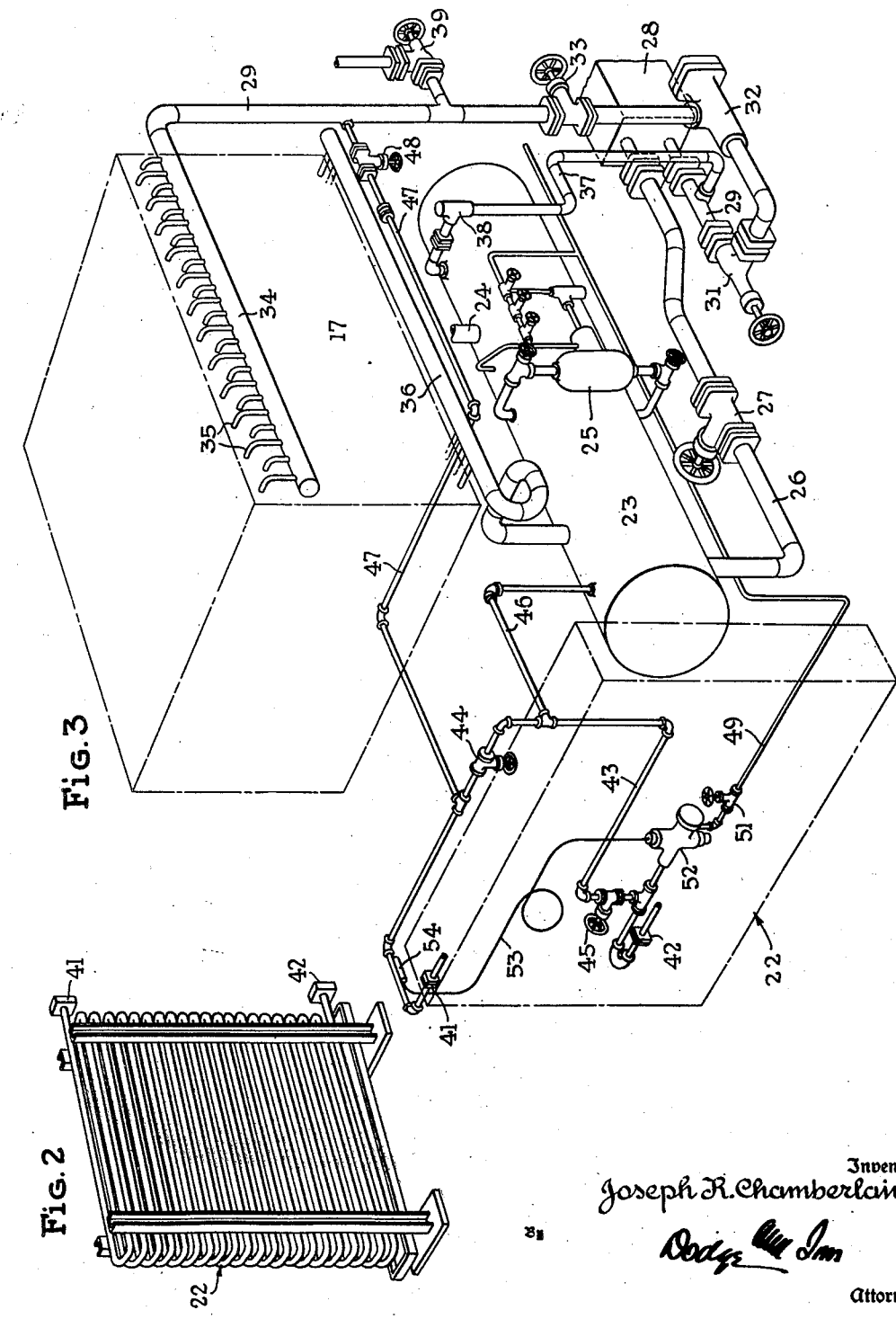

MEANS FOR REDUCING FROSTING IN LOW-TEMPERATURE FREEZERS

Joseph R. Chamberlain, York, Pa., assignor to York Corporation, York, Pa., a corporation of Delaware Application February 13, 1947, Serial No. 728,276

8 Claims. (Cl. 62—2)

This invention relates to the freezing of foods, and particularly to apparatus in which the food is frozen by circulating refrigerated air in contact with the food.

Meat and fish when frozen without a wrapper have exposed wet surfaces. Most vegetables and some fruits are commonly frozen as received wet from a blanching or washing operation. Under these conditions the air picks up considerable moisture from the articles being frozen, particularly when the articles while still warm are subjected to the frigid air stream.

In continuous systems in which the articles are conveyed through a tunnel or tower while subjected to a stream of refrigerated air, the air is always deriving moisture from the goods and depositing it as frost on the refrigerating surface.

For compactness, finned refrigerating surface is desirable, but such surface is both troublesome to defrost and subject to the greatest loss of efficiency upon the accumulation of frost. Thus, there is a great need for some means to retard frost accumulation.

When all the moisture derived from the goods being frozen is allowed to freeze on the main freezing surface, it not only decreases the efficiency of the freezing surface for cooling the air but also blocks up the air passages through the coil so that the quantity of air circulated decreases as the frost formation increases. Thus, freezing of the product is retarded, and the capacity of the freezer is reduced materially. The freezer must be shut down with undue frequency to remove the frost accumulation on the main freezing surface. These difficulties are especially annoying and expensive in a continuous fast freezing process.

An object of this invention is to provide a separate refrigerated frost-accumulating coil in the path of the warmest and most heavily moisture laden air. This coil is designed to freeze the moisture out of the air at a point in the air circuit where air flow will not be retarded by frost accumulation. The frost-accumulating coil is so proportioned and so located within the enclosure as to permit air to flow around it even when the coil surface has become heavily coated with frost. By the use of such a frost-accumulating coil, separate from the main freezing surface, it is made possible to operate such freezers for longer periods without interrupting the process to defrost.

Moreover, the present invention contemplates the use of an auxiliary refrigerating surface to perform two related functions. It serves as the frost coil, above discussed and in addition it performs stand-by service. This auxiliary surface is placed in the path of air from the goods to the main refrigerating surface, and is operated at a temperature so low as to attract and arrest in the form of frost a large proportion of the air-carried moisture. In the preferred embodiment this surface is close to the product being frozen, and is not finned, so as to be readily freed of frost accumulations by scraping.

The stand-by function is to hold a freezing temperature in the food freezer while the main refrigerative surface is shut down, as it may be during lunch periods, over night, or at any time for defrosting the main evaporator. A small fan is used to provide active air circulation when the main evaporator and main air circulating fan are shut down.

The invention will now be described as used with the tower type of freezer invented by another and marketed by applicant's assignee.

In the drawings:

Fig. 1 is a vertical section through the freezing room.

Fig. 2 is a fragmentary perspective showing the preferred form of the frost accumulating coil.

Fig. 3 is a perspective diagram of the piping for the two evaporators.

Under normal operating conditions liquid refrigerant is drawn from a receiver suction trap by a pump, and is delivered to the top of the main evaporator and to the top of the auxiliary evaporator. Any liquid refrigerant not evaporated while flowing downward through the evaporators is conducted from the bottom of the evaporator to the trap. The two evaporators are thus connected in parallel.

When the main evaporator is shut down for any reason the pump also is shut down. A thermal expansion valve is cut in to feed liquid refrigerant from the high pressure receiver to the bottom of the auxiliary evaporator and the top of this evaporator is connected to the gas space in the receiver suction trap. Thus, the auxiliary evaporator is fed in two characteristically different ways.

Refer to Fig. 1. An insulating enclosure for a freezing room is indicated at 6. Four columns 7 define the corners of a rectangular tower in which a stack of rectangular trays 8 are moved upward step by step by a reciprocating platform 9 which is periodically lifted and lowered by a hydraulic lift 11. When the stack is lifted the bottom tray is latched (by means not visible in the drawing) so that it cannot retreat. After the platform lowers a new tray is pushed from a loading station (not shown) along a track 12 into position on the platform and beneath the stack. At the same time a tray with frozen contents is forced off the top of the stack onto track 13 which leads to a dumping mechanism (not shown).

The trays 8 have high sides at 14 and lower ends at 15. A fan 16 draws air from within the enclosure 6 and forces it in contact with main evaporator 17 and through duct 18. Thence it passes through the upper half of the tray stack in streams above and below individual trays, enters the duct 19 and returns to the room and so to the fan through paths above and below trays in the lower half of the stack. The fan 16 is driven by a motor 21.

The scheme so far described is the invention of another and is embodied in freezers manufactured by applicant's assignee, and now in commercial use. The invention is applicable to other types of food freezers using circulated frigid air, for example "tunnel freezers."

According to the present invention an auxiliary coil 22 extends across the path of air discharging from the lower half of the stack of trays. This coil is so constructed and located that if the air path through the coil should become completely clogged by frost, still the air can flow around the coil and reach fan 16. Coil 22 as illustrated in Fig. 2, may be a flat single-pass zig-zag coil operated in parallel with the main evaporator, so that it and the main evaporator operate at substantially equal temperatures. The lower the temperature of coil 22 the more effective it will be to intercept moisture. When sufficient surface can be had without fins, the coil 22 is smooth but in some cases finning is desirable. The main evaporator 17 is finned and, as shown, is of considerable "depth," measured in the direction of air flow.

Refrigerant connections are partially illustrated in Fig. 1 but can be understood better if reference is made to Fig. 3.

A receiver suction trap is shown at 23 and has a suction connection 24 leading to the usual compressor. The liquid supply to receiver 23 is controlled by low side float valve 25 which derives liquid from the high pressure receiver 20. Such a valve functions as an expansion valve. Part of the liquid which passes the valve flashes into vapor, chilling itself and the remaining unvaporized liquid. The low side float valve thus serves to maintain in receiver 23 a constant level of liquid at the low temperature characteristic of the suction pressure which exists therein. This is a familiar scheme for feeding to the evaporators liquid refrigerant which enters the evaporators at the temperature of operation of the evaporators. No novelty resides in the compressor and condenser which deliver liquefied refrigerant to the receiver 20, and they are not illustrated. It is desirable to locate them outside enclosure 6.

A liquid line 26 leads from the bottom of receiver 23 through a normally open stop valve 27 to pump 28. The pump is driven by a motor indicated in the drawing but only when the main evaporator is in operation. From this pump a delivery line 29 leads through a normally open stop valve 31, strainer 32 and normally open stop valve 33 to the supply header 34 of evaporator 17. Branch connections 35 lead to the various coil units making up evaporator 17 and these in turn discharge into the manifold 36 which leads back to the top of receiver 23.

A connection 37 leads from delivery line 29 through relief valve 38 (set at say 25 pounds per sq. in.) to the top of receiver 23, so that the pump may never develop excessive pressure. A valve 39, which is normally closed, controls the supply of "hot gas" for defrosting purposes.

The auxiliary evaporator coil 22 has a connection 41 at its upper end and a connection 42 at its lower end. Since the suction and supply connections to this coil must be interchanged, there is a cross connecting line 43 between upper connection 41 and lower connection 42 and in line 43 are two manually operable stop valves 44 and 45. Between these two valves line 43 is connected by branch 46 with the vapor space in the upper part of receiver 23 and consequently with suction line 24.

From line 29 beyond valve 33 a line 47 controlled by stop valve 48 leads to connection 41. From high pressure receiver 20 a liquid line 49 leads through stop valve 51 and thermally controlled expansion valve 52 to lower connection 42. The thermal bulb 54 connected to valve 52 by capillary tube 53 is located at or near top connection 41.

Food freezers are normally adjuncts to cold storage rooms in which the products are held. Consequently, the compressor to which suction connection 24 leads is in operation substantially continuously, so that receiver 23 is maintained at an appropriate suction pressure.

During normal food freezing operations the evaporators 17 and 22 are operated in parallel with pump-circulated refrigerant. Hence, valves 51 and 44 are closed and valves 48 and 45 are open. When the evaporator 17 is shut down, coil 22 is operated by closing valves 45 and 48 and opening valves 51 and 44.

It is not necessary to describe defrosting operations, since these will be obvious to those skilled in the art and can be performed in various ways.

When coil 22 is operating alone its function is to hold a sub-freezing temperature within enclosure 6. To assure that the coil's refrigerative action is effective in all parts of the enclosure a blower 55 is operated to circulate air within the enclosure.

In the above description details of a commercially successful embodiment of the invention have been described with particularity. This embodiment is illustrative and limitation to the specific construction is not implied. Evaporator 22 should be of such form and so located as to attract and freeze moisture from air leaving the trays and particularly the warmer (lowermost) trays of the stack. Air leaving trays containing wet unfrozen food is the most heavily laden with moisture. Hence, the greatest benefit in reducing frostation of the main coil is derived by preliminary treatment of air flowing from these trays. Air leaving all the trays is moisture laden to a serious extent, and hence auxiliary surface 22 performs a useful function as to all.

Where practicable, smooth coils are preferred for evaporator 22 because defrosting can be expedited by mechanical removal of frost after thawing at the coil surface. With a finned coil it is usually necessary to melt all the frost, a relatively slow procedure.

What is claimed is:

1. The combination of a food freezer comprising a thermally insulated enclosure; means for conveying through the enclosure material to be frozen; a main refrigerative evaporator;

means to circulate air in the enclosure alternately into heat exchanging relation with the said main evaporator and with material being conveyed; an auxiliary evaporator operable conjointly with the main evaporator to collect as frost, airborne moisture flowing toward the main evaporator; means to operate the auxiliary evaporator independently of the main evaporator; and auxiliary air circulating means operable to circulate air in the enclosure in contact with the auxiliary evaporator alone, when the first named circulation means is not in operation.

2. In a food freezing plant, the combination of a thermally insulated enclosure; conveying means for transporting layers of material in a controlled path within said enclosure while affording extended surface exposure of the material; a main refrigerative evaporator; means comprising a fan and related duct for passing air in a confined stream from the space within said enclosure into contact first with the evaporator and then with said material; and an auxiliary evaporator interposed in the path of air flowing from contact with said material, said auxiliary evaporator being so located that air may by-pass it and reach the entrance to said duct even though the auxiliary coil becomes clogged by frost.

3. In a food freezing plant, the combination of a thermally insulated enclosure; conveying means for transporting layers of material in a controlled path within said enclosure while affording extended surface exposure of the material; a main refrigerative evaporator; means comprising a fan and related duct for passing air in a confined stream from the space within said enclosure into contact first with the evaporator and then with said material, in two passes, the first with at least partly frozen material, and the second with less frozen and unfrozen material; and an auxiliary evaporator interposed in the path of air discharging from said second pass, said auxiliary evaporator being so located that air may by-pass it and reach the entrance to said duct even though the auxiliary coil becomes clogged by frost.

4. In a food-freezing plant, the combination of a thermally insulated enclosure; conveying means for transporting layers of material to be frozen, through said enclosure, while affording extended surface exposure thereof; a main refrigerative evaporator; means for circulating air in heat-exchanging relation with said main evaporator, then in contact with said material and then back to heat-exchanging relation with said main evaporator and so on in circuit; an auxiliary refrigerative evaporator interposed in the path of air flowing from contact with the material back to the main evaporator, said auxiliary evaporator being of a type adapted for comparatively rapid de-frosting; liquid-refrigerant circulating means and connections arranged to circulate liquid refrigerant through both evaporators in parallel with one another; and means for subjecting both evaporators to substantially the same suction pressure.

5. The combination defined in claim 4 in which manually operable control means and a thermal expansion valve are provided, said control means being manipulable to suspend the operation of said circulating means, isolate the main evaporator from the auxiliary evaporator and operate the auxiliary evaporator with refrigerant controlled by said expansion valve.

6. In a food-freezing plant, the combination of a thermally insulated enclosure; conveying means for transporting layers of material to be frozen, through said enclosure, while affording extended surface exposure thereof; a main refrigerative evaporator of the finned type; means for circulating air in heat-exchanging relation with said main evaporator, then in contact with said material and then back to heat-exchanging relation with said main evaporator and so on in circuit; an auxiliary refrigerative evaporator interposed at a readily accessible location in the path of air flowing from contact with the material to the main evaporator, said auxiliary evaporator being of a type permitting mechanical removal of frost; connections for supplying volatile liquid refrigerant to and for withdrawing evaporated refrigerant from said evaporators in normal operation; a valve-controlled hot gas connection; and valve means associated with at least the main evaporator, said valve means and the valved hot gas connection being so arranged as to be operable to isolate the main evaporator from the refrigerative circuit and admit hot gas to said main evaporator, while the auxiliary evaporator continues to perform its normal refrigerative function.

7. The combination defined in claim 6 in which said valve means and the valved hot gas connection are associated with both evaporators and are so arranged as to be operable to isolate the main evaporator from the refrigerative circuit and admit hot gas to the main evaporator, while the auxiliary evaporator continues to perform its normal refrigerative function, and alternatively to admit hot gas to both evaporators.

8. In a food-freezing plant, the combination of a thermally insulated enclosure; conveying means for transporting layers of material to be frozen, through said enclosure, while affording extended surface exposure thereof; a main refrigerative evaporator; means for circulating air in heat-exchanging relation with said main evaporator, then in contact with said material and then back to heat-exchanging relation with said main evaporator and so on in circuit; an auxiliary refrigerative evaporator interposed in the path of air flowing from contact with the material back to the main evaporator; means for shutting down the main evaporator while the auxiliary evaporator operates; and air circulating means for establishing in said enclosure a secondary air circulation in contact with said auxiliary evaporator.

JOSEPH R. CHAMBERLAIN.

REFERENCES CITED

The following references are of record in the file of this patent:

UNITED STATES PATENTS

| Number | Name | Date |
| --- | --- | --- |
| 2,370,267 | Starr | Feb. 27, 1945 |
| 2,435,462 | Patterson | Feb. 3, 1948 |